(12) United States Patent
Hara et al.

(10) Patent No.: US 7,440,743 B2
(45) Date of Patent: Oct. 21, 2008

(54) IP TELEPHONE SYSTEM FOR SAVING POWER OF MOBILE TELEPHONE

(75) Inventors: Yasushi Hara, Kawasaki (JP); Toshiya Miyazaki, Kawasaki (JP); Youichi Kondou, Kawasaki (JP); Satoshi Kikuchi, Kawasaki (JP); Kazuyuki Takaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 617 days.

(21) Appl. No.: 11/205,116

(22) Filed: Aug. 17, 2005

(65) Prior Publication Data
US 2006/0258323 A1 Nov. 16, 2006

(30) Foreign Application Priority Data
May 16, 2005 (JP) .............................. 2005-142764

(51) Int. Cl.
H04B 1/16 (2006.01)
(52) U.S. Cl. .................. 455/343.2; 455/41.2; 455/41.3; 455/422.1; 455/426.1; 379/201.01
(58) Field of Classification Search ............... 455/343.2
See application file for complete search history.

(56) References Cited

U.S. PATENT DOCUMENTS

| | | | |
|---|---|---|---|
| 6,151,493 A | | 11/2000 | Sasakura et al. |
| 6,892,052 B2 * | | 5/2005 | Kotola et al. ............... 455/41.2 |
| 7,349,871 B2 * | | 3/2008 | Labrou et al. ................. 705/26 |
| 2004/0002305 A1 * | | 1/2004 | Byman-Kivivuori et al. ...... 455/41.2 |
| 2004/0176032 A1 * | | 9/2004 | Kotola et al. ............... 455/41.2 |
| 2005/0079817 A1 * | | 4/2005 | Kotola et al. ............... 455/41.2 |

(Continued)

FOREIGN PATENT DOCUMENTS

JP 11-88499 3/1999

(Continued)

*Primary Examiner*—Mathew Andeson
*Assistant Examiner*—Hai V Nguyen
(74) *Attorney, Agent, or Firm*—Kratz, Quintos & Hanson, LLP

(57) ABSTRACT

When the presence of an RF ID tag is detected by a contactless reader/writer, an information processing terminal causes a contactless reader/writer to set a state flag in the RF ID tag to a first state which indicates that a wireless LAN communication unit of the mobile telephone is in an inactive state, and sends presence information indicating the presence of the mobile telephone to the information processing apparatus. When the state flag in the RF ID tag is set to the first state, the mobile telephone disables the wireless LAN communication unit. The information processing apparatus receives the presence information and stores the received presence information in a database. When the information processing apparatus receives a request for terminating an incoming IP telephone call on the mobile telephone, it searches the database and sends, to the information processing terminal, information indicating the incoming call, and also transfers, to the wireless LAN access point, an IP packet signaling the incoming call. When the information processing terminal receives the incoming call information from the information processing apparatus, it causes the contactless reader/writer to set the state flag in the RF ID tag to a second state which indicates that the wireless LAN communication unit of the mobile telephone is in an active state. When the state flag in the RF ID tag is set to the second state, the mobile telephone enables the wireless LAN communication unit.

10 Claims, 9 Drawing Sheets

U.S. PATENT DOCUMENTS

| | | | |
|---|---|---|---|
| 2005/0085226 A1* | 4/2005 | Zalewski et al. | 455/426.1 |
| 2005/0152544 A1* | 7/2005 | Kizawa | 380/55 |
| 2005/0170828 A1* | 8/2005 | Nakamura et al. | 455/419 |
| 2005/0207551 A1* | 9/2005 | Nagashima | 379/201.01 |
| 2006/0043164 A1* | 3/2006 | Dowling et al. | 235/375 |
| 2006/0058018 A1* | 3/2006 | Toulis et al. | 455/422.1 |
| 2006/0116127 A1* | 6/2006 | Wilhoite et al. | 455/442 |
| 2006/0153409 A1* | 7/2006 | Yeh | 381/333 |
| 2006/0165060 A1* | 7/2006 | Dua | 370/352 |
| 2006/0232412 A1* | 10/2006 | Tabacman et al. | 340/572.1 |
| 2006/0258289 A1* | 11/2006 | Dua | 455/41.3 |
| 2006/0262924 A1* | 11/2006 | Weiss et al. | 379/413.01 |
| 2007/0037605 A1* | 2/2007 | Logan | 455/567 |
| 2007/0037610 A1* | 2/2007 | Logan | 455/574 |
| 2007/0197261 A1* | 8/2007 | Humbel | 455/558 |
| 2007/0293200 A1* | 12/2007 | Roundtree et al. | 455/414.1 |
| 2008/0020781 A1* | 1/2008 | Cho | 455/456.1 |

FOREIGN PATENT DOCUMENTS

| | | |
|---|---|---|
| JP | 2931276 | 3/1999 |
| JP | 2003-32261 | 1/2003 |
| JP | 2004-235713 | 8/2004 |

* cited by examiner

IP TELEPHONE SYSTEM FOR SAVING POWER OF MOBILE TELEPHONE

FIELD OF THE INVENTION

The present invention relates generally to IP mobile telephone communications via an access point for a wireless local area network (LAN), and more particularly to a mobile telephone system that can reduce the battery power consumption of a mobile telephone.

BACKGROUND OF THE INVENTION

In recent years, IP (Internet Protocol) telephone systems for VoIP (Voice over IP) over intranets and the Internet have been spreading rapidly in offices.

On the other hand, mobile telephones incorporating two telephone modules, one for communication over a mobile communication network and the other for communication over a wireless LAN, have appeared on the market, as exemplified by FOMA™ mobile telephones.

Japanese Unexamined Patent Publication JP H 11-88499-A (corresponding to JP Patent 2931276-B and U.S. Pat. No. 6,151,493A) published on Mar. 30, 1999 by Sasakura et al. describes an apparatus for prohibiting the use of a mobile or cellular phone. The apparatus can disable a cellular phone or any other device if it separates more than a predetermined distance from the user, and at the same time give a warning to the user. It includes an identification signal transmission unit and a use prohibition mode canceling unit attached or mounted to the cellular phone. Each unit has a transmitter and a receiver. The receiver of the canceling unit receives an ID code signal from the transmission unit and produces, based on the ID signal received, a use prohibition canceling signal. The canceling unit returns a confirmation signal to the transmission unit. If the two units separate more than a predetermined distance from each other, the levels of the ID signal and the confirmation signal received by the respective units drop below a predetermined value. Thus, the canceling unit stops producing the canceling signal to disable the cellular phone, while the transmission unit sounds an alarm.

Japanese Unexamined Patent Publication JP 2003-32261-A published on Jan. 31, 2003 by Ayazuka et al. describes a communication system. In this system, a contactless IC card for communicating with a contactless reader/writer of a personal computer via electromagnetic waves is incorporated in each mobile telephone. When the user brings the mobile telephone into the vicinity of the PC, and the contactless IC card receives the electromagnetic waves radiated from the contactless reader/writer, the mobile telephone sends the card ID of the contactless IC card to the personal computer. The card ID includes the Bluetooth device name of another party to communicate with after the personal computer has established synchronization within a piconet, and the personal computer identifies the communicating party based on that name.

Japanese Unexamined Patent Publication JP 2004-235713-A published on Aug. 19, 2004 by Mineo describes an information providing system, which can provide information that matches the area where the mobile communication terminal is located and also can handle incoming calls and electronic mail in real time, while minimizing the connection standby time that consumes large standby power. The information providing system comprises an RF ID reader which reads the terminal identification information of the mobile communication terminal by transmitting a radio wave to an RF ID tag attached to the mobile communication terminal in a connection standby mode with minimum power consumption, and an information providing server which provides information to the mobile communication terminal via a first communication means. The RF ID reader includes an identification information transmitting means. The information providing server includes an identification information receiving means, a terminal identifying means, an area identifying means, and an information providing means.

SUMMARY OF THE INVENTION

In accordance with an aspect of the present invention, an IP telephone system comprises: an information processing apparatus connected to an external network, an internal network and a wireless LAN access point; an information processing terminal connected to the information processing apparatus over the internal network; and a mobile telephone adapted to connect to the wireless LAN access point. The mobile telephone comprises a wireless LAN communication unit for communicating with the wireless LAN access point, and an RF ID tag. The information processing terminal includes a contactless reading and writing device adapted to read or write data from or to the RF ID tag. When the presence of the RF ID tag is detected by the contactless reading and writing device, the information processing terminal causes the contactless reading and writing device to set a state flag in the RF ID tag to a first state which indicates that the wireless LAN communication unit of the mobile telephone is in an inactive state, and sends presence information indicating the presence of the mobile telephone to the information processing apparatus. When the state flag in the RF ID tag is set to the first state, the mobile telephone disables the wireless LAN communication unit. The information processing apparatus receives the presence information and stores the received presence information in a database. When the information processing apparatus receives a request for terminating an incoming IP telephone call on the mobile telephone, the information processing apparatus searches the database and then sends, to the information processing terminal, incoming call information indicating the incoming call, and also transfers, to the wireless LAN access point, an IP packet signaling the incoming call. When the information processing terminal receives the incoming call information from the information processing apparatus, the information processing terminal causes the contactless reading and writing device to set the state flag in the RF ID tag to a second state which indicates that the wireless LAN communication unit of the mobile telephone is in an active state. When the state flag in the RF ID tag is set to the second state, the mobile telephone enables the wireless LAN communication unit to allow IP telephone communication.

The invention also relates to an information processing terminal and a mobile telephone for implementing the system described above.

The invention also relates to programs recorded on computer-readable recording media for implementing the information processing terminal and the mobile telephone described above.

DESCRIPTION OF THE PREFERRED EMBODIMENTS

There is a need for reducing the power consumption of a mobile telephone as much as possible to extend its battery run time longer, because the battery capacity is limited. A wireless LAN mobile telephone in a standby mode periodically receives a beacon signal from an wireless LAN access point, which reduces the battery run time due to its power consumption.

The inventors have recognized that the power consumption can be reduced by setting a mobile telephone so that, when the mobile telephone is located within a certain range of an information processing terminal, it neither receives nor responds to beacon signals from the wireless LAN access point but is enabled to communicate with the access point only upon call initiation or call arrival on the mobile telephone.

An object of the present invention is to reduce the power consumption of a mobile device for IP telephone communications in a wireless LAN communication system.

According to the invention, a mobile device can reduce the power consumption for IP telephone communications in a wireless LAN communication system.

The invention will be described in connection with non-limiting embodiments with reference to the accompanying drawings. Throughout the drawings, similar symbols and numerals indicate similar items and functions.

Figure 1:
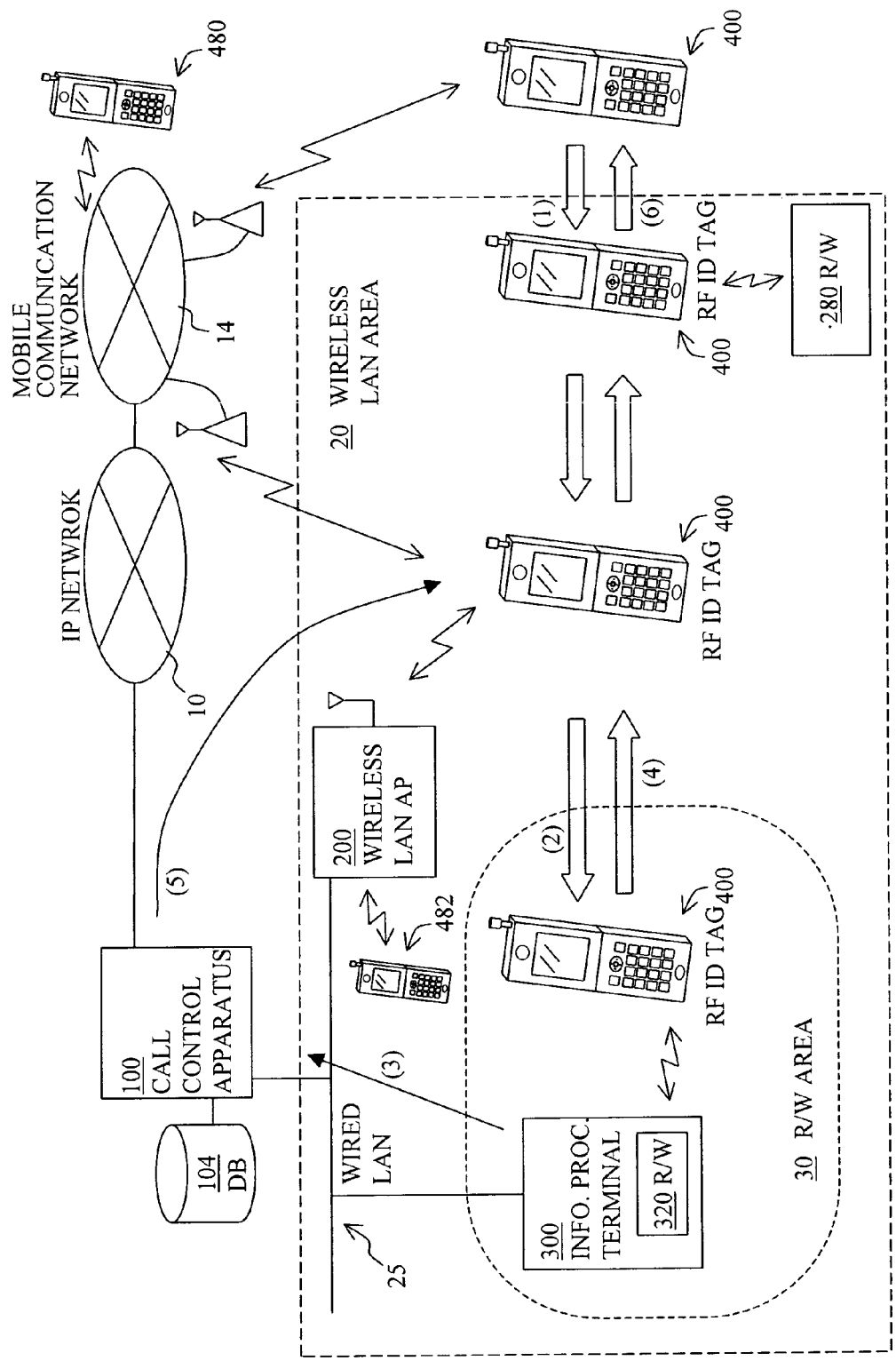
FIG. 1 shows a schematic configuration of an IP telephone system for communication via a wireless LAN, in accordance with an embodiment of the present invention.

FIG. 1 shows a schematic configuration of an IP telephone system for communication over a wireless LAN, in accordance with an embodiment of the present invention. The IP telephone system includes: a call control apparatus 100 connected to an external IP network 10, such as the Internet, and to a wired LAN 25; a wireless LAN access point (AP) 200 connected to the wired LAN 25; an information processing terminal 300 connected to the wired LAN 25; a mobile telephone 400 having a communication unit for telephone communication over a mobile communication network 14 and a communication unit for wireless LAN telephone communication with the wireless LAN access point 200; and a contactless reader/writer device (R/W) 280 for reading and writing an ID from and to an RF ID tag incorporated into the mobile telephone 400. The wired LAN 25 can be replaced by a wireless LAN implemented by the wireless LAN access point 200 connected to the call control apparatus 100. Alternatively, the wireless LAN access point 200 may be connected directly to the call control apparatus 100 without using the wired LAN 25.

The mobile telephone 400 can perform telephone communication with another mobile telephone 480 and the like over the mobile communication network 14. It can also perform telephone communication with another wireless LAN mobile telephone 482 and the like within a wireless LAN area 20 via the wireless LAN access point 200. Within the wireless LAN area 20, the mobile telephone 400 can also perform IP telephone communication with outside telephones, such as the telephone 480, over the wireless LAN access point 200, the call control apparatus 100, the Internet 10 and the mobile communication network 14.

Figure 2:
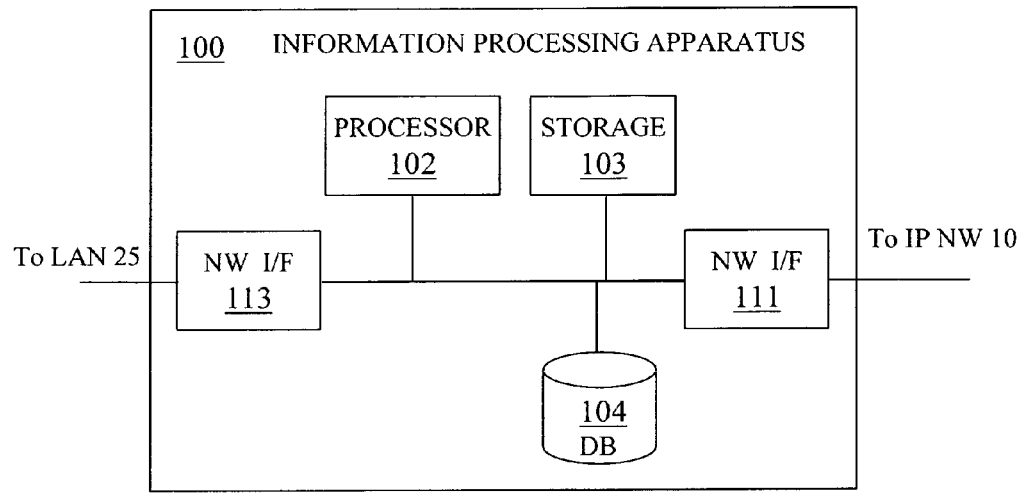
FIG. 2 shows a configuration of an information processing apparatus as a call control apparatus, in accordance with the embodiment of the invention.

FIG. 2 shows a configuration of an information processing apparatus 100 as the call control apparatus, in accordance with the embodiment of the invention. The information processing apparatus 100 includes a processor 102, a storage device 103, a database (DB) 104, a network interface (NW/IF) 111 connected to the IP network 10, and a network interface (NW/IF) 113 connected to the LAN 25. The database 104 stores the IP telephone numbers and related information of the telephones 400, 482 and the like that perform IP telephone communication via the wireless LAN access point 200. It also stores an IP address of information processing terminal 300, when the mobile telephone 400 is located near the information processing terminal 300. The function of the processor 102 may be implemented on the processor 102 in accordance with a program stored in the storage device 103, or in the form of hardware such as an LSI.

Figure 3:
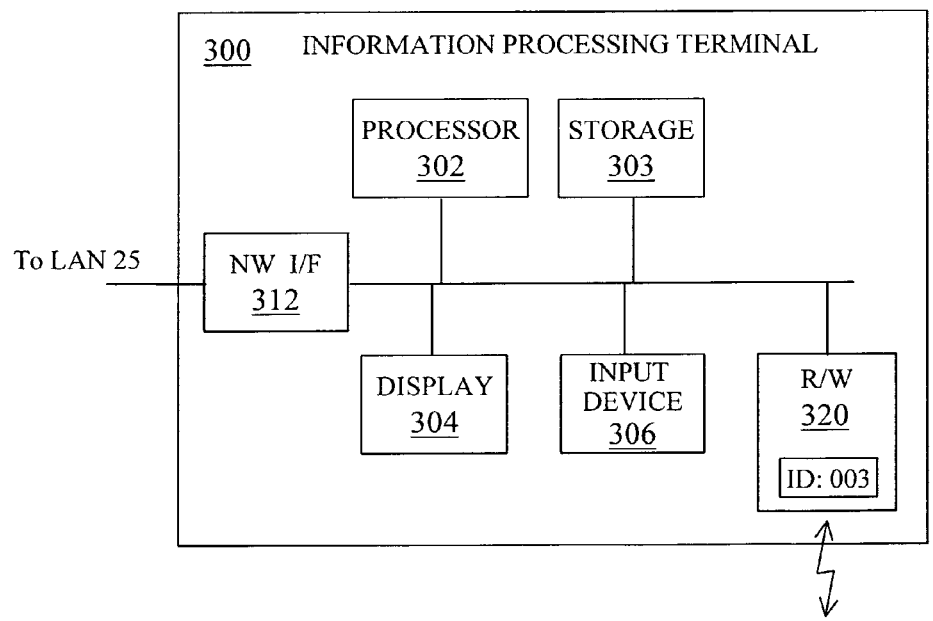
FIG. 3 shows a configuration of an information processing terminal in accordance with the embodiment of the invention.

FIG. 3 shows a configuration of the information processing terminal 300 in accordance with the embodiment of the invention. The information processing terminal 300 includes a processor 302, a storage device 303, a display device 304, an input device 306, an network interface 312 connected to the LAN 25, and an contactless reader/writer device (R/W) 320 for reading and writing data from and to the RF ID tag. The information processing terminal 300 has the contactless reader/writer device 320 connected thereto. The function of the processor 302 may be implemented on the processor 302 in accordance with a program stored in the storage device 303, or in the form of hardware such as an LSI.

Figure 4:
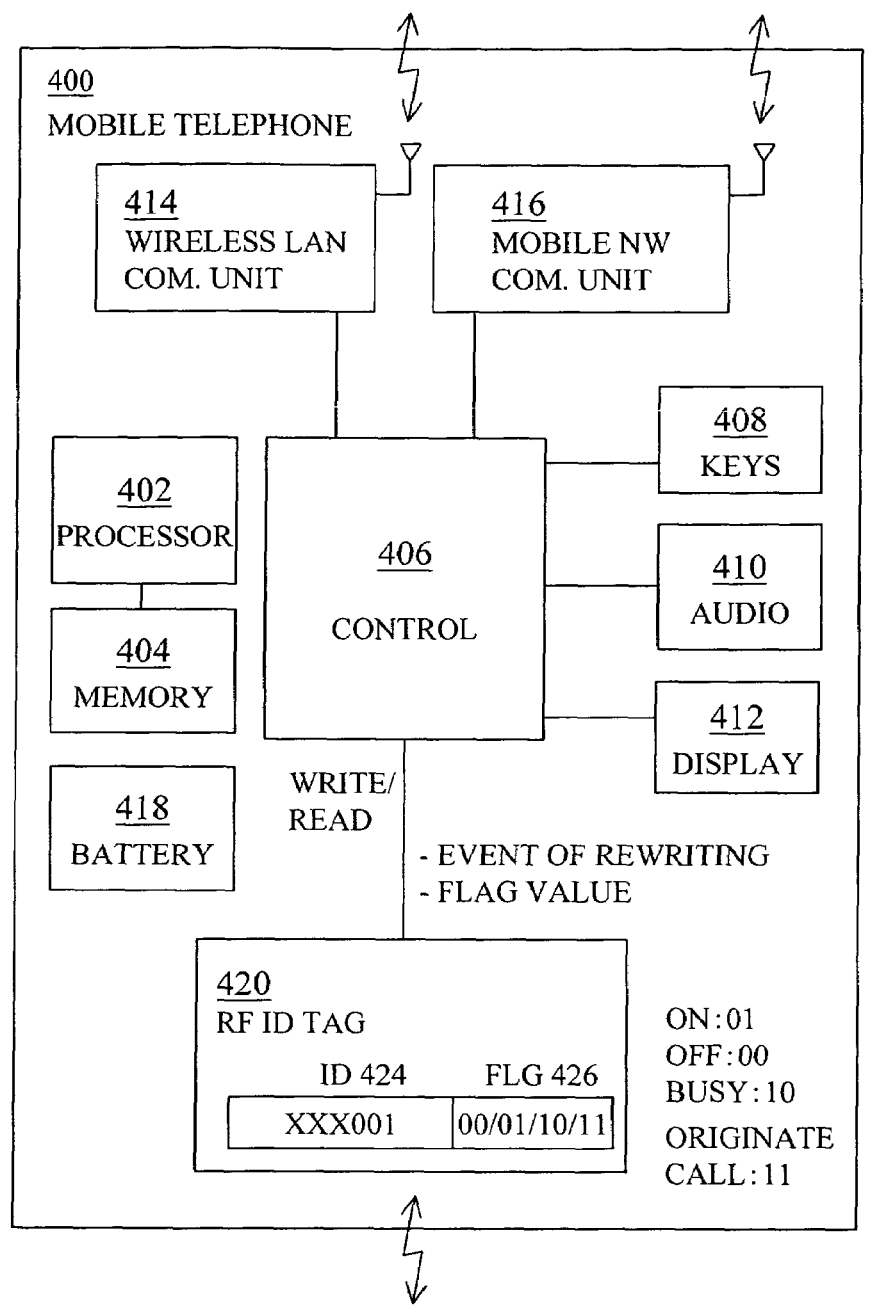
FIG. 4 shows a configuration of a mobile telephone in accordance with the embodiment of the invention.

FIG. 4 shows a configuration of the mobile telephone 400 in accordance with the embodiment of the invention. The mobile telephone 400 includes a processor 402, a memory device 404, a control unit 406, a plurality of keys 408, an audio unit 410 which includes a microphone, a receiver and a speaker, a display device 412, a wireless LAN communication unit 414, a mobile network communication unit 416, a battery 418, and an RF ID tag 420. The RF ID tag 420 is incorporated into the mobile telephone 400 and coupled to it, and the control unit 406 in the mobile telephone 400 can read information from the memory in the RF ID tag 420. The function of the control unit 406 may be implemented on the processor 402 in accordance with a program stored in the storage device 406.

The RF ID tag 420 may be of a passive type or of an active type, and stores a specific ID 424 indicating the identification of the mobile telephone 400 and a state flag (FLG) 426 indicating the operating state of its wireless LAN communication function. The RF ID tag 402 of a passive type consumes less battery power. The control unit 406 controls the RF ID tag 420, to write, update, and read information in the RF ID tag 420. Information is read from and written to the RF ID tag 420 in a known manner by the contactless reader/writer (R/W) 280 and by the contactless reader/writer (R/W) 320 connected to the information processing terminal 300. The information processing terminal 300 may be a personal computer installed, for example, in an office for use by the user. The battery 418 supplies power to the elements 402 to 416 of the mobile telephone 400, and also to the RF ID tag 420 if the RF ID tag 420 is of an active type. The power consumption of the mobile network communication unit 416 is reduced to a minimum or zero, while it is disabled.

Figure 5:
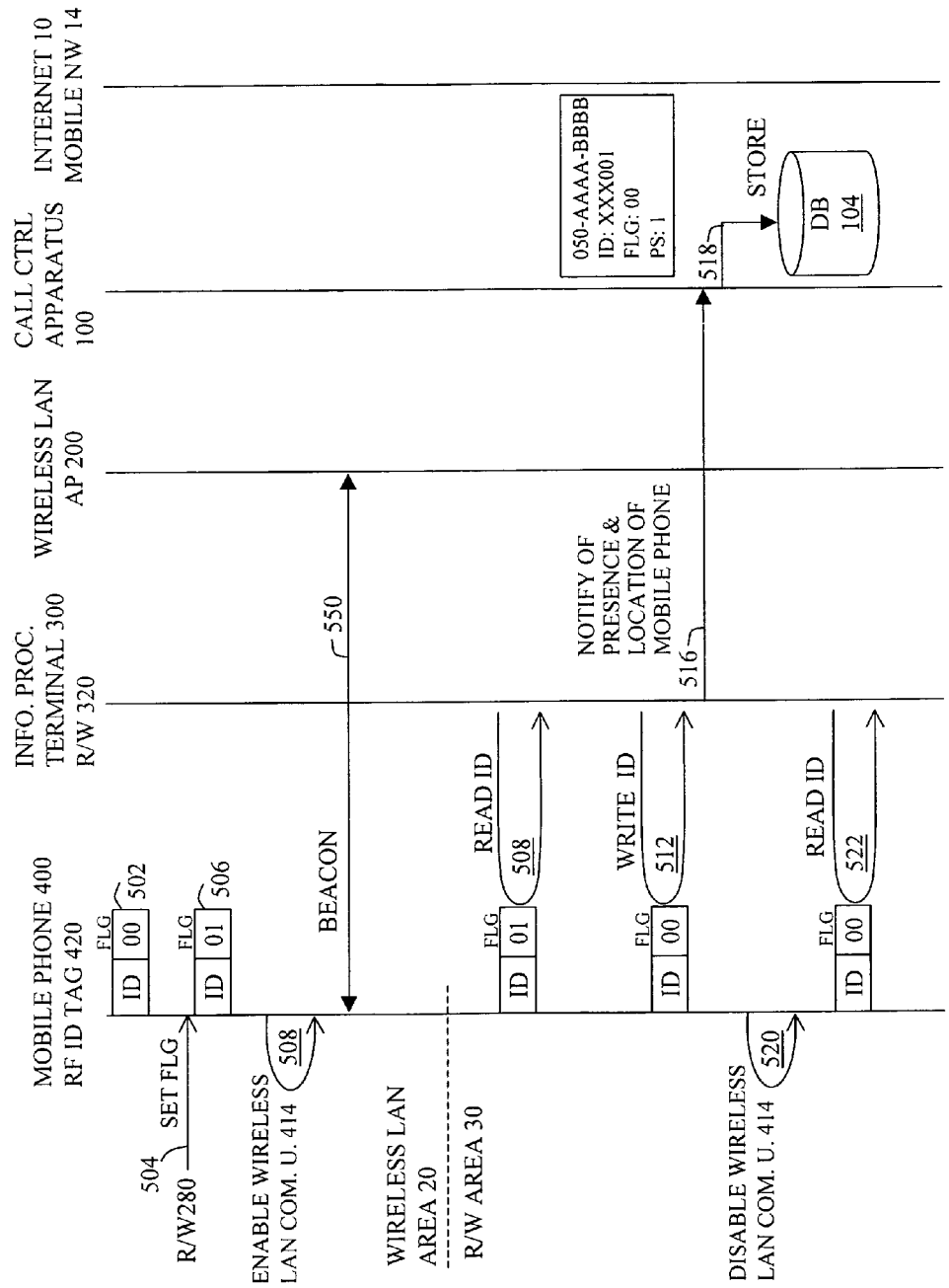
FIG. 5 shows the operations of the mobile telephone, the information processing terminal, and the call control apparatus, when a user carrying the mobile telephone enters the wireless LAN area and moves into an R/W area of a contactless reader/writer device of the information processing terminal.

FIG. 5 shows the operations of the mobile telephone 400, the information processing terminal 300, and the call control apparatus 100, when, as shown by arrows (1) and (2) in FIG. 1, the user carrying the mobile telephone 400 enters the wireless LAN area 20 and then moves into the R/W area 30 of the contactless reader/writer 320 connected to the information processing terminal 300.

Referring to FIGS. 1 and 5, outside the wireless LAN area 20 (at the far right in FIG. 1), the state flag (FLG) in the RF ID tag 420 of the mobile telephone 400 has a value "00" (state 502) which indicates that the wireless LAN communication unit 414 is in an inactive state. When the user carrying the mobile telephone 400 enters the wireless LAN area 20, as shown by the arrow (1), then the value "00" of the state flag (FLG) 426 in the RF ID tag 420 of the mobile telephone 400 is rewritten or changed at Step 504 by the contactless reader/writer 280 installed at the entrance of the wireless LAN area 20 to a value "01" (state 506) which indicates that the wireless LAN communication unit 414 is in an active state. When the state flag 426 in the RF ID tag 420 is thus rewritten, the control unit 406 of the mobile telephone 400 at Step 508 detects the event of flag rewriting and reads the value of the state flag 426. Then, the control unit 406 enables the wireless LAN communication unit 414 in accordance with the value "01" of the state flag 426.

In process 550, when the state flag 426 has the value "01" in the wireless LAN area 20, the mobile telephone 400 receives a beacon signal from the wireless LAN access point 200 in the conventional manner. The mobile telephone 400 can originate or terminate a call via the wireless LAN access point 200 to establish telephone communication session with another mobile telephone 482 located within the wireless LAN area 20 or another mobile telephone 480 located outside the wireless LAN area 20.

When, as shown by the arrow (2), the user carrying the mobile telephone 400 moves into the contactless R/W area 30 which represents the RF communication range of the contactless reader/writer 320 of the information processing terminal 300 located within the wireless LAN area 20, the contactless reader/writer 320 under control of the processor 302 of the information processing terminal 300 at Step 508 detects the RF ID tag 420 of the mobile telephone 400 and reads the ID 424 (e.g., "XXX001") and the value "01" of the state flag 426 from the RF ID tag 420. In response to the value "01" of the state flag 426, the processor 302 at Step 512 causes the contactless reader/writer 320 to rewrite the state flag 426 in the RF ID tag 420 of the mobile telephone 400 from the value "01" indicating the active state of the wireless LAN communication unit 414 to the value "00" indicating the inactive state of the wireless LAN communication unit 414. Further, the processor 302 stores the value "00" of the state flag 426 and a state information value "1" indicating the presence of the mobile telephone 400 in the contactless R/W area 30, into the storage device 303, by associating them with the IP telephone number (e.g., "050-AAAA-BBBB") and the ID 424 (e.g., "XXX001") of the mobile telephone 400 prestored in the storage device 303. The IP telephone number of the mobile telephone 400 may be prestored in the memory of the RF ID tag 420 rather than in the storage device 303.

At Step 516, the processor 302 sends, to the call control apparatus 100, information related to the mobile telephone 400 together with the IP address of the information processing terminal 300, in which the related information contains the ID (e.g., "003") of the contactless reader/writer 320, the IP telephone number (e.g., "050-AAAA-BBBB") of the mobile telephone 400, the ID 424 (e.g., "XXX001") and the value ("00") of the state flag 426 which in combination represent the location and state of the mobile telephone 400, and also contains a state information value "1" which indicates the presence of the mobile telephone 400 in the R/W area 30. At Step 518, the processor 102 of the call control apparatus 100 stores these pieces of information in the database 104 by associating them with the pre-registered IP telephone number.

At Step 520, the control unit 406 of the mobile telephone 400 disables the wireless LAN communication unit 414 in accordance with the value "00" of the state flag 426. The disabled wireless LAN communication unit 414 does not receive beacon signals being transmitted from the wireless LAN access point 200. Thus, the power consumption of the battery 418 can be reduced. Thus, while the mobile telephone 400 is in the R/W area 30, the wireless LAN communication unit 414 of the mobile telephone 400 is always in the inactive state. However, the mobile communication unit 416 is always in the active state. Then, the contactless reader/writer 320 at Step 522 periodically reads the ID 424 and the state flag 426 in the RF ID tag 420 in the conventional manner.

Figure 6:
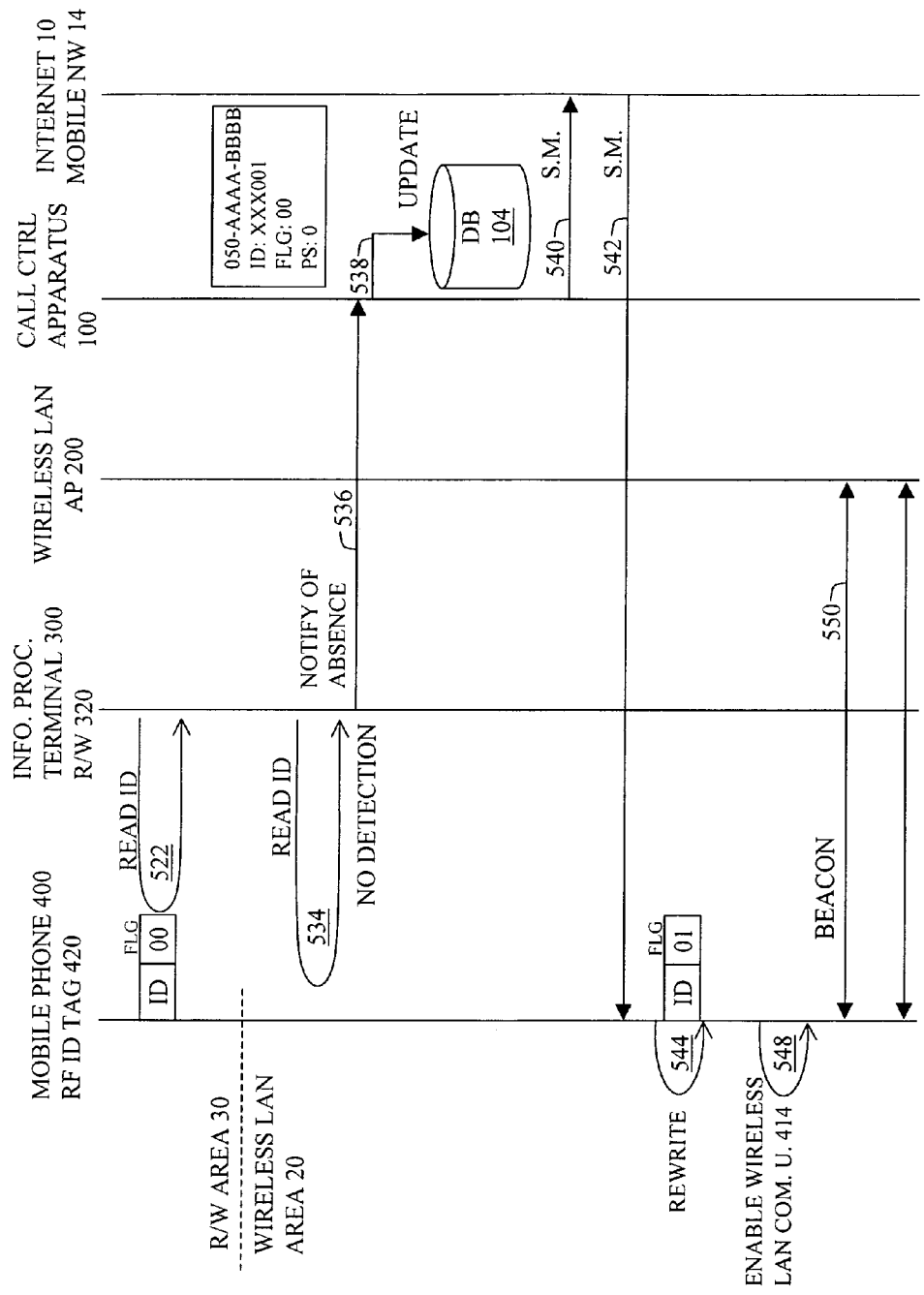
FIG. 6 shows the operations of the mobile telephone, the information processing terminal and the call control apparatus, when the user carrying the mobile telephone leaves the R/W area and moves to another location within the wireless LAN area.

FIG. 6 shows the operations of the mobile telephone 400, the information processing terminal 300 and the call control apparatus 100, when the user carrying the mobile telephone 400 leaves the R/W area 30 and moves to another location within the wireless LAN area 20, as shown by an arrow (3) in FIG. 1.

Referring to FIGS. 1 and 6, at Step 522, when the mobile telephone 400 is located within the R/W area 30, the contactless reader/writer 320 periodically reads the ID 424 and the state flag 426 of the RF ID tag 420 in the conventional manner.

When the user carrying the mobile telephone 400 leaves the R/W area 30 and moves to another location within the wireless LAN area 20, the contactless reader/writer 320 at Step 534 attempts to read the RF ID tag 420 of the mobile telephone 400, but cannot detect the RF ID tag 420. In response to the non-detection of the RF ID tag 420, the processor 302 of the information processing terminal 300 at Step 536 sends, to the call control apparatus 100, the ID of the contactless reader/writer 320, the IP telephone number and ID 424 of the mobile telephone 400, the value ("00") of the state flag 426, and the state information value ("0") indicating the absence of the mobile telephone 400 in the R/W area 30. Next, the processor 302 rewrites the state flag 426 and the state information value, both stored in the storage device 303, to the values indicating that the mobile telephone 400 is located outside the area. At Step 538, the processor 102 of the call control apparatus 100 updates the information related to the mobile telephone 400 stored in the database 104, with the received state information.

At Step 540, the processor 102 sends a short message S.M. to the mobile telephone 400 over the IP network 10 and the mobile communication network 14, in which the short message S.M. carries an instruction to rewrite the value of the state flag to the value "01", i.e., an instruction to enable the wireless LAN communication unit 414. At Step 542, the short message S.M. is transferred to the mobile telephone 400 over the IP network 10 and the mobile communication network 14. In response to the short message S.M. received by the mobile communication unit 416 of the mobile telephone 400, the control unit 406 at Step 544 rewrites the state flag 426 of the RF ID tag 420 from the value "00" to the value "01". In response to the event of flag rewriting, the control unit 406 at Step 548 enables the wireless LAN communication unit 414 in accordance with the thus rewritten flag value "01". In process 550, the mobile telephone 400 receives a beacon signal from the wireless LAN access point 200 in the conventional manner. In this way, the mobile telephone 400 can perform communication over the wireless LAN.

When the user carrying the mobile telephone 400 passes by the contactless reader/writer 280 and leaves the wireless LAN area 20, as indicated by an arrow (6), the contactless reader/writer 280 rewrites the state flag 426 in the RF ID tag 420 of the mobile telephone 400 from the value "01" to the value "00". The control unit 406 disables the wireless LAN communication unit 414 in accordance with the value "00" of the state flag 426.

Figure 7:
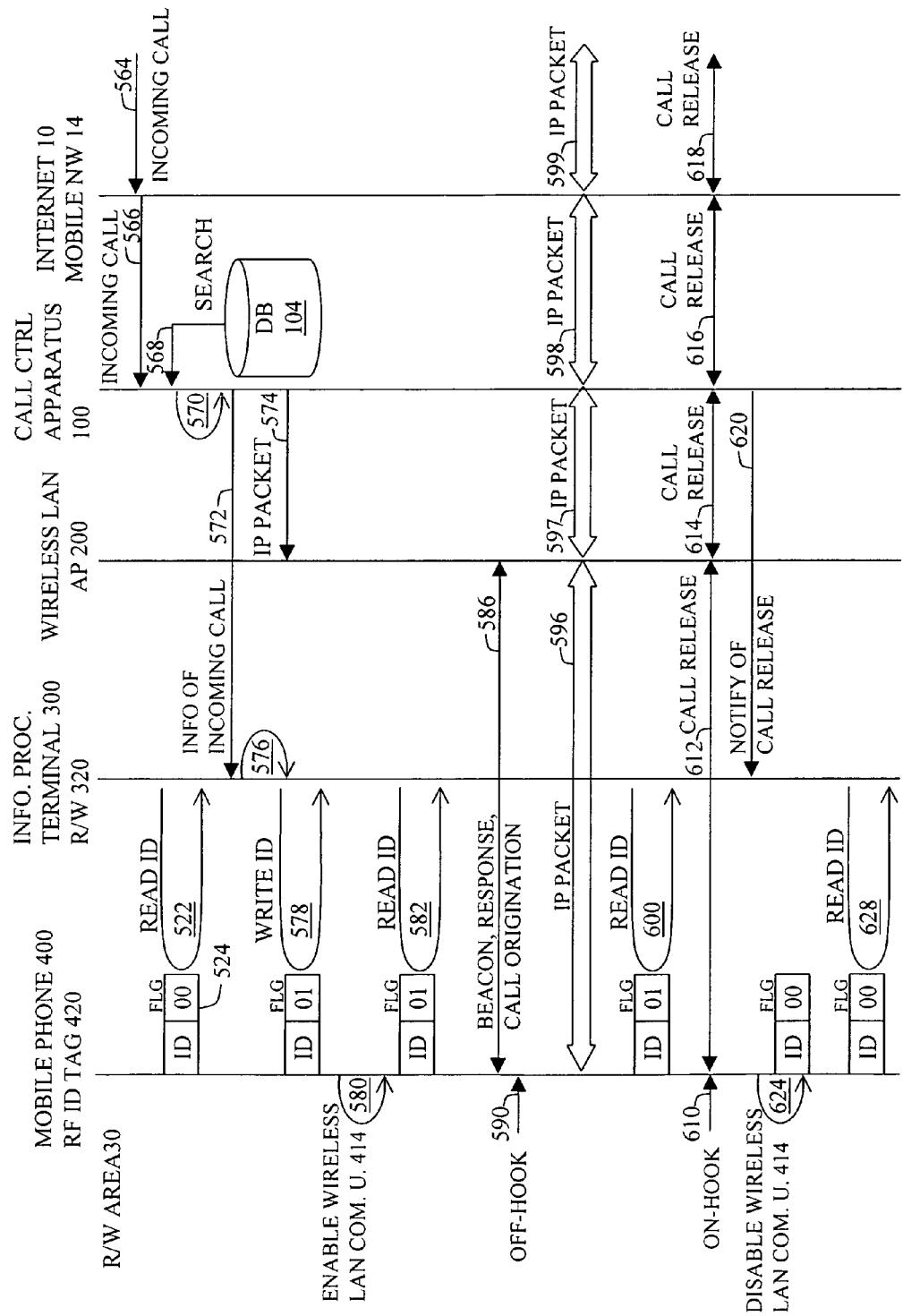
FIG. 7 shows a procedure by which an incoming call is caused to be terminated on the mobile telephone, while the mobile telephone is located within the R/W area.

FIG. 7 shows a procedure by which an incoming call is caused to be terminated on the mobile telephone 400, while the mobile telephone 400 is located within the R/W area 30.

Referring to FIG. 7, at Step 522, the contactless reader/writer 320 periodically reads the ID 424 and the state flag 426 from the RF ID tag 420. At Step 564, another mobile telephone such as the mobile telephone 480 originates a call to the mobile telephone 400 with the IP telephone number ("050-AAAA-BBBB") over the Internet 10 and the mobile communication network 14. At Step 566, the processor 102 of the call control apparatus 100 receives an IP packet signaling the incoming call over the Internet 10. The IP packet contains a SIP URI containing the IP telephone number. At Step 568, the processor 102 searches the database 104 by using the received IP telephone number. At Step 570, in accordance with the result of the search, the processor 102 determines whether the mobile telephone 400 is located within the R/W area 30.

If it is determined that the mobile telephone 400 is not located in the R/W area 30, the processor 102 transfers, to the wireless LAN access point 200, the IP packet signaling the incoming call. If the mobile telephone 400 is located in the wireless LAN area 20, the call is terminated on the mobile telephone 400.

If it is determined at Step 570 that the mobile telephone 400 is located within the R/W area 30, then the processor 102 of the call control apparatus 100 at Step 572 sends, to the information processing terminal 300, information on the incoming call to notify it of the incoming call to the mobile telephone 400, and the processor 102 at Step 574 transfers, to the wireless LAN access point 200, an IP packet signaling the incoming call to the mobile telephone 400.

Upon receipt of the incoming call information, the processor 302 of the information processing terminal 300 at Step 576 instructs the contactless reader/writer 320 to alter the content of the RF ID tag 420 of the mobile telephone 400. Further, the processor 302 updates the value "00" of the state flag 426 for the mobile telephone 400, prestored in the storage device 303, to the value "01". At Step 578, the contactless reader/writer 320 rewrites the state flag 426 from the value "00" to the value "01" in accordance with the above instruction.

At Step 580, the control unit 406 enables the wireless LAN communication unit 414 in accordance with the thus rewritten value "01" of the state flag 426. At Step 582, the contactless reader/writer 320 periodically reads the ID 424 and the state flag 426 in the RF ID tag 420, and the processor 302 checks whether the state flag 426 has the value "01".

In a process 586, the mobile telephone 400 is enabled to receive a beacon signal, and the wireless LAN access point 200 transmits a beacon signal containing information indicating the appearance of packet data to be received by the mobile telephone 400. When the wireless LAN access point 200 receives a response from the mobile telephone 400, the incoming call is caused to be terminated on the mobile telephone 400. The control unit 406 of the mobile telephone 400 receives the beacon signal from the wireless LAN access point 200, and transmits a response back in the conventional manner, and then receives or terminates the incoming call and generates a ringing or beep sound through the speaker of the audio unit 408.

When the user takes the mobile telephone 400 off the hook at Step 590, IP packets for IP telephone communication are transferred between the mobile telephone 400 and the outside mobile telephone 480 via the wireless LAN access point 200, the call control apparatus 100, the Internet 10 and the mobile communication network 14 in processes 596 to 599. Thus the call is established between the mobile telephones 400 and 480, so that both of the telephones take a state of voice communication. During the voice communication, the contactless reader/writer 320 at Step 600 periodically reads the ID 424 and the state flag 426 in the RF ID tag 420 to check the value of the state flag 426 in the conventional manner.

When the mobile telephone 400 or 480 goes on-hook at Step 610, an IP packet signaling that the call has been released is transferred via the wireless LAN access point 200, the call control apparatus 100, the Internet 10 and the mobile communication network 14, in processes 612, 614, 616 and 618.

When the mobile telephone 400 goes on-hook, the control unit 406 at Step 624 disables the wireless LAN communication unit 414 and rewrites the value of the state flag 426 in the RF ID tag 420 to the value "00".

When the call has been released, the processor 102 of the call control apparatus 100 at Step 620 sends an IP packet indicating a notification of the call release to the information processing terminal 300. The processor 302 of the information processing terminal 300 stores the state indicating the call release of the mobile telephone 400 into the storage device 303. At Step 628, the processor 302 instructs the contactless reader/writer 320 to read the RF ID tag 420 periodically. The processor 302 checks whether the state flag 426 in the RF ID tag 420 has the value "00" corresponding to the call release state. If, at this time, the state flag 426 has the value "01", the processor 302 instructs the contactless reader/writer 320 to rewrite the value of the state flag 426 to the value "00".

Figure 8:
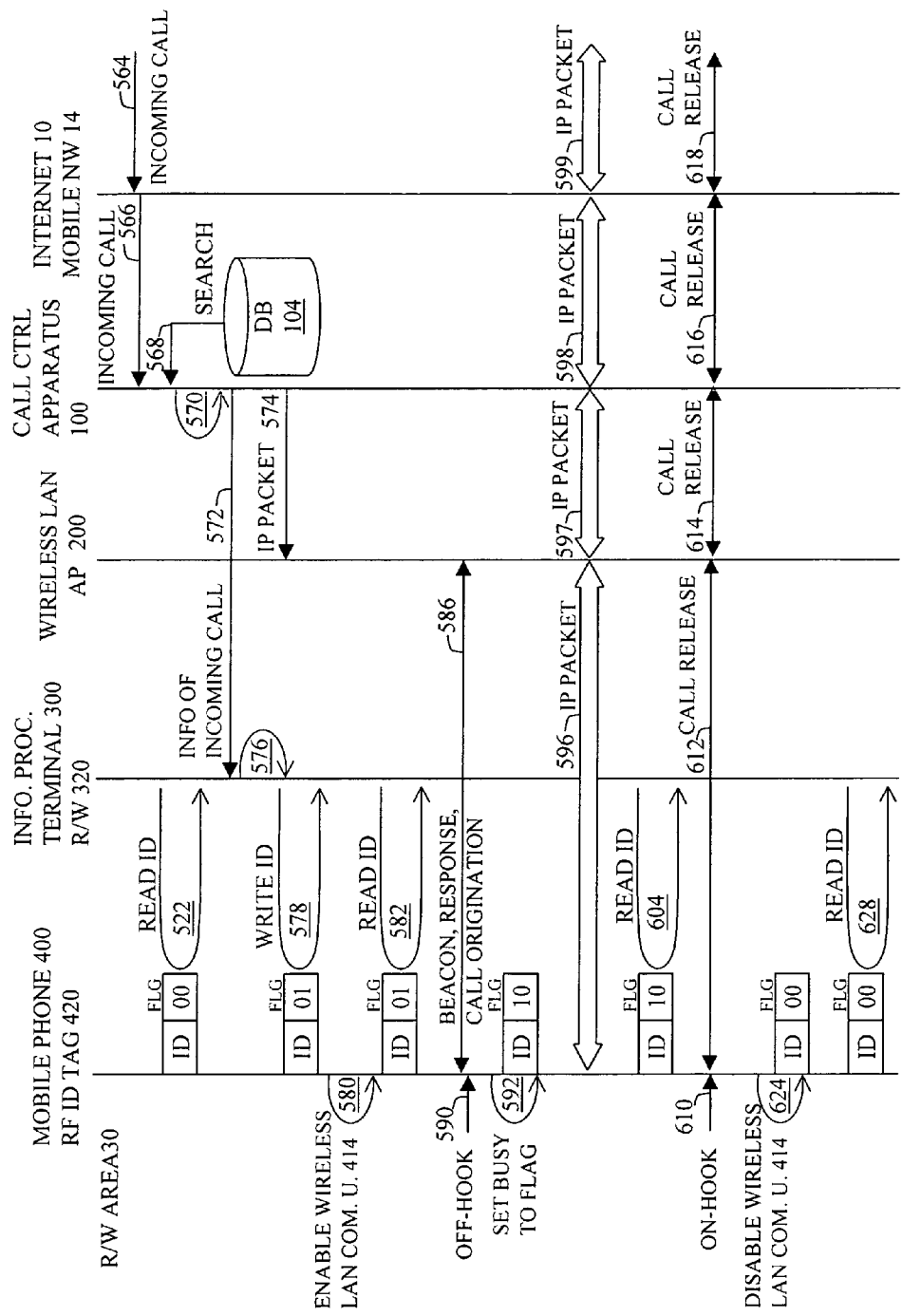
FIG. 8 shows an alternative procedure by which an incoming call is caused to be terminated on the mobile telephone, while the mobile telephone is located within the R/W area.

FIG. 8 shows an alternative procedure by which an incoming call is caused to be terminated on the mobile telephone 400, while the mobile telephone 400 is located within the R/W area 30. FIG. 8 differs from FIG. 7 in that Step 620 of FIG. 7 for sending an IP packet indicating a notification of the call release is eliminated, Step 592 is added, and Step 600 of FIG. 7 is replaced by Step 604. Otherwise, the procedure of FIG. 8 is similar to that of FIG. 7.

In FIG. 8, after the mobile telephone 400 goes off-hook at Step 590, the control unit 406 at Step 592 rewrites the value of the state flag 426 to a value "10" which indicates a busy state. At Step 604, the contactless reader/writer 320 read the value "10" of the state flag 426 from the RF ID tag 420, and detects that the mobile telephone 400 is engaged in voice communication. The processor 302 updates the value of the state flag 426, stored in the storage device 303, to the value "10".

After the mobile telephone 400 goes on-hook at Step 610 and the value of the state flag 426 is rewritten to the value "00" at Step 624, the processor 302 at Step 628 detects that the value of the state flag 426 in the RF ID tag 420 read out by the contactless reader/writer 320 is the value "00", and hence determines that the call has been released. The processor 302 updates the value of the state flag 426, stored in the storage device 303, to the value "00".

When another mobile telephone 482 located within the wireless LAN area 20 originates a call via the wireless LAN access point 200 to the mobile telephone 400 with its IP telephone number as a destination, the call control apparatus 100, the information processing terminal 300, and the mobile telephone 400 operate in the same manner as described above. However, in this case, the call is neither routed via the Internet 10 nor via the mobile communication network 14.

Figure 9:
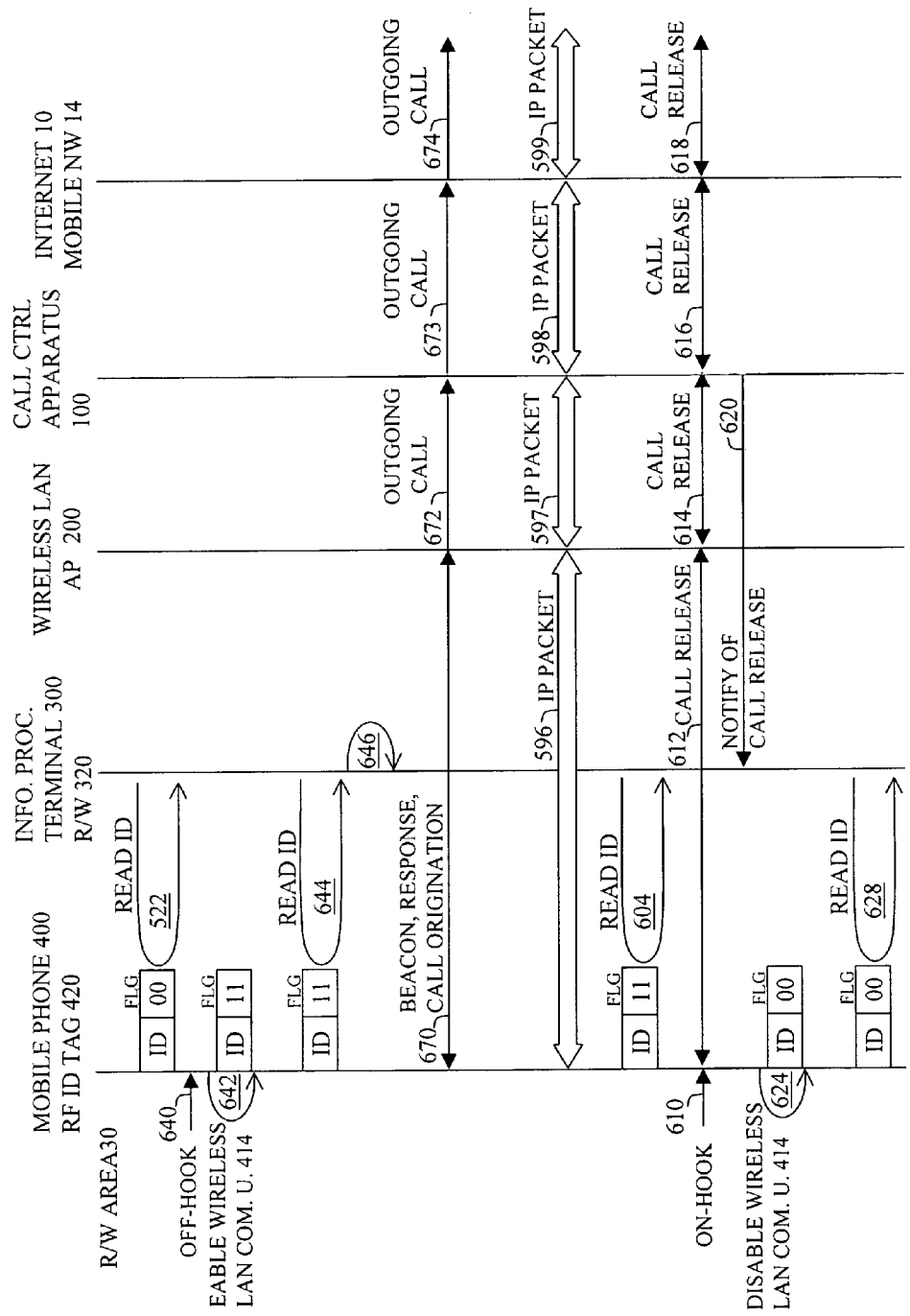
FIG. 9 shows a procedure by which the mobile telephone originates a call, while the mobile telephone is located within the R/W area.

FIG. 9 shows a procedure by which the mobile telephone 400 originates a call, while the mobile telephone 400 is located within the R/W area 30.

When the user at Step 640 takes the mobile telephone 400 off-hook, and originates a call to the mobile telephone 480 by entering its IP telephone number, the control unit 406 rewrites the value of the state flag 426 in the RF ID tag 420 from the value "00" to a value "11" indicating the call origination or the value "01" indicating the active state of the wireless LAN communication unit 414. The control unit 406 enables the wireless LAN communication unit 414 in accordance with the thus changed flag value "11" or "01".

At Step 644, the contactless reader/writer 320 reads the ID 424 and the value "11" or "01" of the state flag 426 in the RF ID tag 420. At Step 646, the processor 302 detects that the state flag 426 has the value "11" or that the value has changed from "00" to "01", and thus determines that the mobile telephone 400 has originated a call. The processor 302 updates the value of the state flag 426, stored in the storage device 303, to the value In process 670, the wireless LAN communication unit 414 of the mobile telephone 400 is enabled to receive a beacon signal from the wireless LAN access point 200, and originates the call by establishing a connection with the wireless LAN access point 200. In process 672, the wireless LAN access point 200 transfers, to the call control apparatus 100, an IP packet signaling the call origination or outgoing call. In processes 673 and 674, the outgoing call IP packet is transferred from the call control apparatus 100 to the mobile telephone 480 over the Internet 10 and the mobile communication network 14. When the mobile telephone 480 goes off-hook, IP packets for IP telephone communication are transferred between the mobile telephone 400 and the outside mobile telephone 480 via the wireless LAN access point 200, the call control apparatus 100, the Internet 10 and the mobile communication network 14 in processes 596 to 599. Thus the call is established between the mobile telephones 400 and 480, so that both of the telephones take a state of voice communication. During the voice communication, the contactless reader/writer 320 at Step 604 periodically reads the ID 424 and the state flag 426 in the RF ID tag 420 in the conventional manner.

When the mobile telephone 400 or 480 goes on-hook at Step 610, an IP packet signaling that the call has been released is transferred via the wireless LAN access point 200, the call control apparatus 100, the Internet 10 and the mobile communication network 14, in procedures 612, 614, 616 and 618.

When the mobile telephone 400 goes on-hook, the control unit 406 at Step 624 disables the wireless LAN communication unit 414 and rewrites the value of the state flag 426 in the RF ID tag 420 to the value "00".

When the call has been released, the processor 102 of the call control apparatus 100 at Step 620 sends an IP packet indicating a notification of the call release to the information processing terminal 300. The processor 302 of the information processing terminal 300 stores the state indicating the call release of the mobile telephone 400 into the storage device 303. At Step 628, the processor 302 causes the contactless reader/writer 320 to periodically read the RF ID tag 420. The processor 302 checks whether the state flag 426 in the RF ID tag 420 has the value "00" corresponding to the call release state. If, at this time, the state flag 426 has the value "11" or "01", the processor 302 instructs the contactless reader/writer 320 to rewrite the value of the state flag 426 to the value "00".

Figure 10:
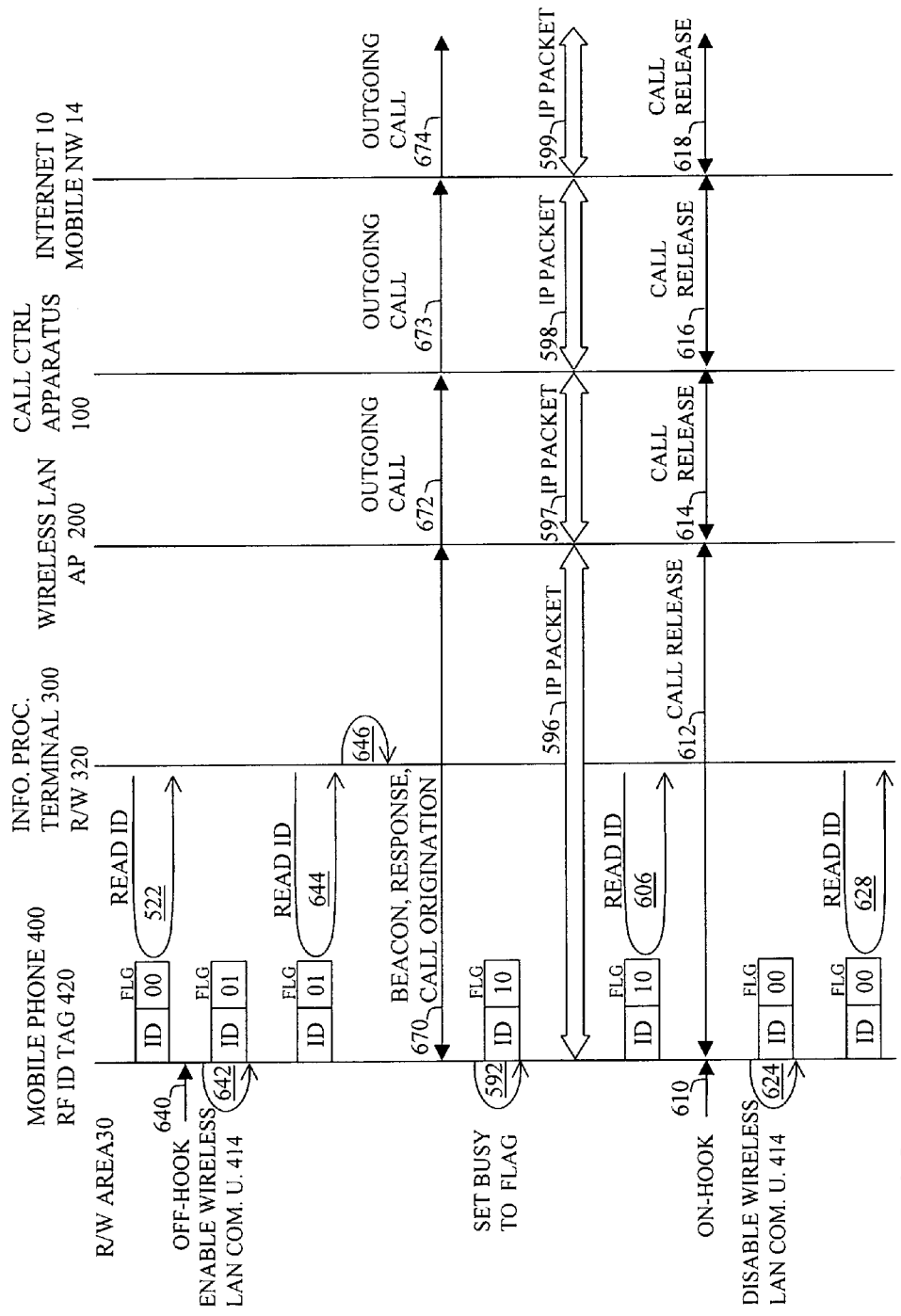
FIG. 10 shows an alternative procedure by which the mobile telephone originates a call, while the mobile telephone is located within the R/W area.

FIG. 10 shows an alternative procedure by which the mobile telephone 400 originates a call, while the mobile telephone 400 is located within the R/W area 30. FIG. 10 differs from FIG. 9 in that Step 620 of FIG. 9 for sending an IP packet indicating a notification of the call release is eliminated, Step 592 is added, and Step 600 of FIG. 9 is replaced by Step 604. Otherwise, the procedure of FIG. 10 is similar to that of FIG. 9. At Step 642, the value of the state flag 426 is rewritten to the value "01" similarly to that in FIG. 8, but not to the value "11".

In FIG. 10, after the mobile telephone 400 goes off-hook at Step 640, the control unit 406 at Step 592 rewrites the value of the state flag 426 to the value "10" which indicates a busy state. At Step 604, the contactless reader/writer 320 reads read the value "10" of the state flag 426 from the RF ID tag 420, and detects that the mobile telephone 400 is engaged in voice communication. The processor 302 updates the value of the state flag 426, stored in the storage device 303, to the value "10".

After the mobile telephone 400 goes on-hook at Step 610, and the value of the state flag 426 is rewritten to the value "00" at Step 624, the processor 302 at Step 628 detects that the value of the state flag 426 in the RF ID tag 420 read out by the contactless reader/writer 320 is the value "00", and hence determines that the call has been released. The processor 302 updates the value of the state flag 426, stored in the storage device 303, to the value "00".

When the mobile telephone 400 originates a call via the wireless LAN access point 200 to another mobile telephone 482 located within the wireless LAN area 20 by entering its IP telephone number, the call control apparatus 100, the information processing terminal 300 and the mobile telephone 400 operate in the same manner as described above. However, in this case, the call is neither routed via the Internet 10 nor via the mobile communication network 14.

In this way, when the mobile telephone 400 is located in the R/W area 30 within the wireless LAN area 20, the mobile telephone 400 is set so as not to receive a beacon signal, thus minimizing the power consumption of the battery 418. A plurality of information processing terminals, each similar to the information processing terminal 300, can be installed at different locations within the wireless LAN area 20. If the user is expected to stay for a long time within the R/W area of any of the information processing terminals thus installed in the wireless LAN area 20, for example, when the information processing terminals 300 are installed near office personal computers and in a conference room or the like in the office, the effect of saving the power consumption of the battery 418 is appreciable. The battery of the mobile telephone will run for a few weeks in the conventional standby mode of operation in the mobile telephone communication, but the battery can run only a few hours in the conventional standby mode of operation for receiving beacon signals in the wireless LAN communication. According to the embodiment of the invention, however, the battery of the mobile telephone can be expected to run one or more days in the conventional standby mode of operation for receiving beacon signals in the wireless LAN communication, because the standby time for receiving beacon signals is reduced.

The above-described embodiments are only typical examples, and their combination, modifications and variations are apparent to those skilled in the art. It should be noted that those skilled in the art can make various modifications to the above-described embodiments without departing from the principle of the invention and the accompanying claims.

What is claimed is:

1. An IP telephone system comprising:
    a call control apparatus connected to an external network, an internal network and a wireless LAN access point; an information processing terminal connected to said call control apparatus over said internal network; and a mobile telephone adapted to connect to said wireless LAN access point, wherein said mobile telephone comprises a wireless LAN communication unit for communicating with said wireless LAN access point, and an RF ID tag unit, and said information processing terminal includes a contactless reading and writing device adapted to read and write data from or to said RF ID tag unit, and wherein when the presence of said RFID tag unit is detected by said contactless reading and writing device, said information processing terminal causes said contactless reading and writing device to set a state flag in said RF ID tag unit to a first state which indicates that said wireless LAN communication unit of said mobile telephone is in an inactive state, and sends presence information indicating the presence of said mobile telephone to said call control apparatus,
    when said state flag in said RF ID tag unit is set to said first state, said mobile telephone disables said wireless LAN communication unit, said call control apparatus receives said presence information and stores said received presence information in a database,
    when said call control apparatus receives a request for terminating an incoming IP telephone call on said mobile telephone, said call control apparatus searches said database and then sends, to said information processing terminal, incoming call information indicating said incoming call, and also transfers, to said wireless LAN access point, an IP packet signaling said incoming call,
    when said information processing terminal receives said incoming call information from said call control apparatus, said information processing terminal causes said contactless reading and writing device to set said state flag in said RF ID tag unit to a second state which indicates that said wireless LAN communication unit of said mobile telephone is in an active state, and
    when said state flag in said RF ID tag unit is set to said second state, said mobile telephone enables said wireless LAN communication unit to allow IP telephone communication.

2. An IP telephone system according to claim 1, wherein, when said mobile telephone is taken off-hook by a user, said mobile telephone sets said state flag in said RF ID tag unit to said second state.

3. An IP telephone system according to claim 1, wherein said mobile telephone further comprises a unit for telephone communication over a mobile communication network connectable to said external network, after said information processing terminal has determined, by causing said contactless reading and writing device to read data from said RF ID tag unit, that said state flag is in said first state, if said contactless reading and writing device fails to detect the presence of said RF ID tag unit, said information processing terminal sends absence information indicating the absence of said mobile telephone to said call control apparatus, and
    when said call control apparatus receives said absence information, said call control apparatus sends, to said mobile telephone over said external network and said mobile communication network, an instruction for instructing said mobile telephone to set said state flag in said RF ID tag unit to said second state.

4. An IP telephone system according to claim 2, wherein said mobile telephone further comprises a unit for telephone communication over a mobile communication network connectable to said external network,
    after said information processing terminal has determined, by causing said contactless reading and writing device to read data from said RF ID tag unit, that said state flag is in said first state, if said contactless reading and writing device fails to detect the presence of said RF ID tag unit, said information processing terminal sends absence information indicating the absence of said mobile telephone to said call control apparatus, and
    when said call control apparatus receives said absence information, said call control apparatus sends, to said mobile telephone over said external network and said mobile communication network, an instruction for instructing said mobile telephone to set said state flag in said RF ID tag unit to said second state.

5. An information processing terminal adapted to connect over an internal network to a call control apparatus which is connected to an external network and to a wireless LAN access point, said information processing terminal comprising: a processor; a storage device; and
    a contactless reading and writing device adapted to read data from an RF ID tag in a mobile telephone and to write data to said RF ID tag unit, and wherein when the presence of said RF ID tag unit is detected by said contactless reading and writing device, said processor instructs said contactless reading and writing device to set a state flag in said RF ID tag unit of said mobile telephone to a first state which indicates that a wireless LAN communication unit of said mobile telephone is in an inactive state, and sends presence information indicating the presence and location of said mobile telephone to said call control apparatus, and
    when information indicating an incoming call is received from said call control apparatus, said processor causes said contactless reading and writing device to set said state flag in said RF ID tag unit of said mobile telephone to a second state which indicates that said wireless LAN communication unit of said mobile telephone is in an active state.

6. An information processing terminal according to claim 5, wherein after said processor has determined, by causing said contactless reading and writing device to read data from said RF ID tag unit, that said state flag is in said first state, if said contactless reading and writing device fails to detect the presence of said RF ID tag unit, said processor sends absence information indicating the absence of said mobile telephone to said call control apparatus in order to cause said mobile telephone to set said state flag in said RF ID tag unit to said second state.

7. An A call control apparatus adapted to be connected to an external network, an internal network and a wireless LAN access point, and connected to an information processing terminal over said internal network, said call control apparatus comprising:
- a processor and a database, wherein said processor receives presence information indicating the presence and location of a mobile telephone from said information processing terminal, and stores said presence information in said database by associating said presence information with a telephone number of said mobile telephone,
- when a request for terminating an incoming IP telephone call on said mobile telephone is received, said processor searches said database and then sends, to said information processing terminal, incoming call information indicating said incoming call, and also transfers, to said wireless LAN access point, an IP packet signaling said incoming call, and
- when absence information indicating the absence of said mobile telephone is received from said information processing terminal, said processor sends, to said mobile telephone over said external network and a mobile communication network, a message carrying an instruction for instructing said mobile telephone to enable a wireless LAN communication unit.

8. A mobile telephone adapted to connect to a mobile communication network and to a wireless LAN access point, said mobile telephone comprising: a control unit; a storage device;
- a wireless LAN communication unit adapted to communicate via said wireless LAN access point;
- a mobile network communication unit adapted to communicate over said mobile communication network; and
- an RF ID tag unit adapted to be read from and written to by a contactless reading and writing device in an information processing terminal, and adapted to be read from by said control unit, wherein
- when a state flag in said RF ID tag unit is set to a first state by said contactless reading and writing device, said control unit disables said mobile communication unit,
- when said state flag in said RF ID tag unit is set to a second state by said contactless reading and writing device, said control unit enables said mobile communication unit, and
- when a message carrying an instruction for instructing said control unit to set said state flag in said RF ID tag unit to said second state is received over said mobile communication network, said control unit sets said state flag in said RF ID tag unit to said second state.

9. A program recorded on a computer-readable recording medium for an information processing terminal adapted to connect over an internal network to a call control apparatus connected to an external network and a wireless LAN access point, said information processing terminal comprising a contactless reading and writing device adapted to read data from an RF ID tag unit in a mobile telephone and to write data to said RF ID tag unit, said program being executed by said information processing terminal to effect the steps of:
- instructing said contactless reading and writing device to set a state flag in said RF ID tag unit of said mobile telephone to a first state, when the presence of said RF ID tag unit is detected by said contactless reading and writing device, and also sending presence information indicating the presence of said mobile telephone to said call control apparatus, wherein said first state indicates that a wireless LAN communication unit incorporated in said mobile telephone is in an inactive state; and
- instructing said contactless reading and writing device to set said state flag in said RF ID tag unit of said mobile telephone to a second state, when information indicating an incoming call is received from said call control apparatus,
- wherein said second state indicates that said wireless LAN communication unit of said mobile telephone is in an active state.

10. A program recorded on a computer-readable recording medium for a call control apparatus adapted to be connected to an external network, an internal network and a wireless LAN access point, and connected to an information processing terminal over said internal network, said program being executed by said call control apparatus to effect the steps of:
- receiving presence information indicating the presence of a mobile telephone from said information processing terminal, and storing said presence information in a database;
- searching said database, when a request for terminating an incoming IP telephone call on said mobile telephone is received and then sending, to said information processing terminal, incoming call information indicating said incoming call, and also transferring, to said wireless LAN access point, an IP packet signaling said incoming call; and
- sending, to said mobile telephone over said external network and said mobile communication network, an instruction for instructing said mobile telephone to enable a wireless LAN communication unit of said mobile telephone, when absence information indicating the absence of said mobile telephone is received from said information processing terminal.

* * * * *